United States Patent
Nomachi et al.

(10) Patent No.: US 9,875,017 B2
(45) Date of Patent: Jan. 23, 2018

(54) DEVICE, METHOD, AND PROGRAM (71) Applicant: KYOCERA Corporation, Kyoto-shi, Kyoto (JP)

(72) Inventors: Nayu Nomachi, Yokohama (JP); Junichi Hasegawa, Machida (JP); Hideko Murakami, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/787,252

(22) PCT Filed: Apr. 24, 2014

(86) PCT No.: PCT/JP2014/061606
§ 371 (c)(1),
(2) Date: Oct. 26, 2015

(87) PCT Pub. No.: WO2014/175395
PCT Pub. Date: Oct. 30, 2014

(65) Prior Publication Data
US 2016/0077702 A1 Mar. 17, 2016

(30) Foreign Application Priority Data
Apr. 26, 2013 (JP) .................................. 2013-093778

(51) Int. Cl.
*G06F 3/0488* (2013.01)
*G06F 3/023* (2006.01)
(Continued)

(52) U.S. Cl.
CPC .......... *G06F 3/0488* (2013.01); *G06F 3/0233* (2013.01); *G06F 3/0412* (2013.01);
(Continued)

(58) Field of Classification Search
None
See application file for complete search history.

(56) References Cited

U.S. PATENT DOCUMENTS

2007/0277126 A1* 11/2007 Park .................... G06F 3/0485
715/866
2008/0094368 A1* 4/2008 Ording ................. G06F 3/0488
345/173
(Continued)

FOREIGN PATENT DOCUMENTS

WO 2008/086302 A1 7/2008
WO 2013/039023 A1 3/2015

OTHER PUBLICATIONS

Sanzui, Sticky! (Fusen Memo), d-Market Appli & Review, [online], Apr. 21, 2013, retrieval date Jul. 3, 2014, Internet, URL: http://app/dcm-gate.com/app_review/001f7sc/>.
(Continued)

*Primary Examiner* — Alexander Eisen
*Assistant Examiner* — Kebede Teshome
(74) *Attorney, Agent, or Firm* — Hauptman Ham, LLP (57) ABSTRACT

A device, includes: a touch screen display; and a controller configured to, when the touch screen display detects that a physical body has moved in a predetermined direction while contacting with the touch screen display, cause an object on which a text is inputtable to be displayed on a screen displayed on the touch screen display along a trajectory of the moving.

15 Claims, 10 Drawing Sheets

(51) Int. Cl.
*G06F 3/041* (2006.01)
*G06F 3/0486* (2013.01)
(52) U.S. Cl.
CPC .......... *G06F 3/0416* (2013.01); *G06F 3/0486* (2013.01); *G06F 3/04883* (2013.01)

(56) References Cited

U.S. PATENT DOCUMENTS

| | | | |
|---|---|---|---|
| 2011/0115825 A1* | 5/2011 | Tetsuhashi | G06F 3/0483 345/672 |
| 2013/0024805 A1 | 1/2013 | In et al. | |
| 2013/0249837 A1* | 9/2013 | Liu | G06F 3/04883 345/173 |
| 2014/0240101 A1 | 8/2014 | Uno | |

OTHER PUBLICATIONS

International Search Report dated Jul. 22, 2014, corresponding to International application No. PCT/JP2014/061606.

* cited by examiner

DEVICE, METHOD, AND PROGRAM

CROSS-REFERENCE TO RELATED APPLICATION

This application is a National Stage of PCT international application Ser. No. PCT/JP2014/061606 filed on Apr. 24, 2014 which designates the United States, incorporated herein by reference, and which is based upon and claims the benefit of priority from Japanese Patent Application No. 2013-093778 filed on Apr. 26, 2013, the entire contents of which are incorporated herein by reference.

FIELD

The present application relates to a device, a method, and a program.

BACKGROUND

A touch screen device equipped with a touch screen is known. The touch screen device includes, for example, a smartphone and a tablet. The touch screen device detects a gesture of a finger, a pen, or a stylus pen through the touch screen. The touch screen device operates according to the detected gesture. An example of an operation according to the detected gesture is described, for example, International Publication Pamphlet No. WO 2008/086302.

A basic operation of the touch screen device is implemented by an operating system (OS) installed in a device. Examples of an OS installed in the touch screen device include, but are not limited to, Android (a registered trademark), BlackBerry (a registered trademark) OS, iOS, Symbian (a registered trademark) OS, and Windows (a registered trademark) Phone.

SUMMARY

A device according to an embodiment comprises: a touch screen display; and a controller configured to, when the touch screen display detects that a physical body has moved in a predetermined direction while contacting with the touch screen display, cause an object on which a text is inputtable to be displayed on a screen displayed on the touch screen display along a trajectory of the moving.

A device according to an embodiment comprises: a touch screen display; and a controller configured to, when a swipe is performed on the touch screen display, cause an object on which a text is inputtable to be displayed on a screen displayed on the touch screen display along a trajectory of the swipe.

A device according to an embodiment comprises: a touch screen display; and a controller configured to, when the touch screen display is traced, cause an object on which a text is inputtable to be displayed on a screen displayed on the touch screen display in a traced region.

A method according to an embodiment is: a method of controlling a device including a touch screen display, comprising: detecting, by the touch screen display, that a physical body has moved in a predetermined direction while contacting with the touch screen display; and causing an object on which a text is inputtable to be displayed on a screen displayed on the touch screen display along a trajectory of the detected moving.

A program according to an embodiment is: a computer program product having computer instructions, stored on a non-transitory computer readable storage medium, for enabling a computer of a device including a touch screen display executing the computer instructions to perform operations comprising: detecting, by the touch screen display, that a physical body has moved in a predetermined direction while contacting with the touch screen display; and causing an object on which a text is inputtable to be displayed on a screen displayed on the touch screen display along a trajectory of the detected moving.

According to the present invention, it is possible to provide a device, a method, and a program in which usability is improved.

DESCRIPTION OF EMBODIMENTS

Hereinafter, an exemplary embodiment of some embodiments will be described in detail with reference to the appended drawings. In the following description, a smartphone is described as an example of a device equipped with a touch screen.

An Embodiment

Figure 1:
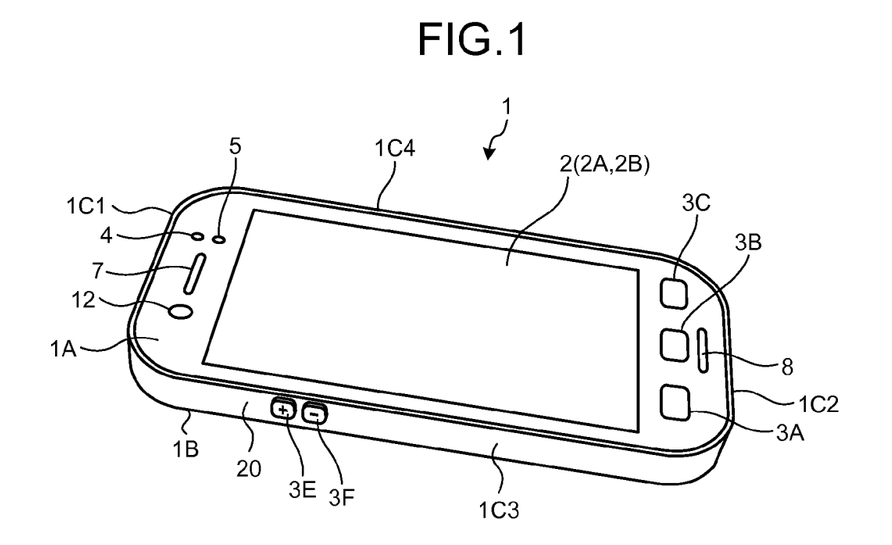
FIG. 1 is a perspective view illustrating an external appearance of a smartphone according to an embodiment of some embodiments.
Figure 2:
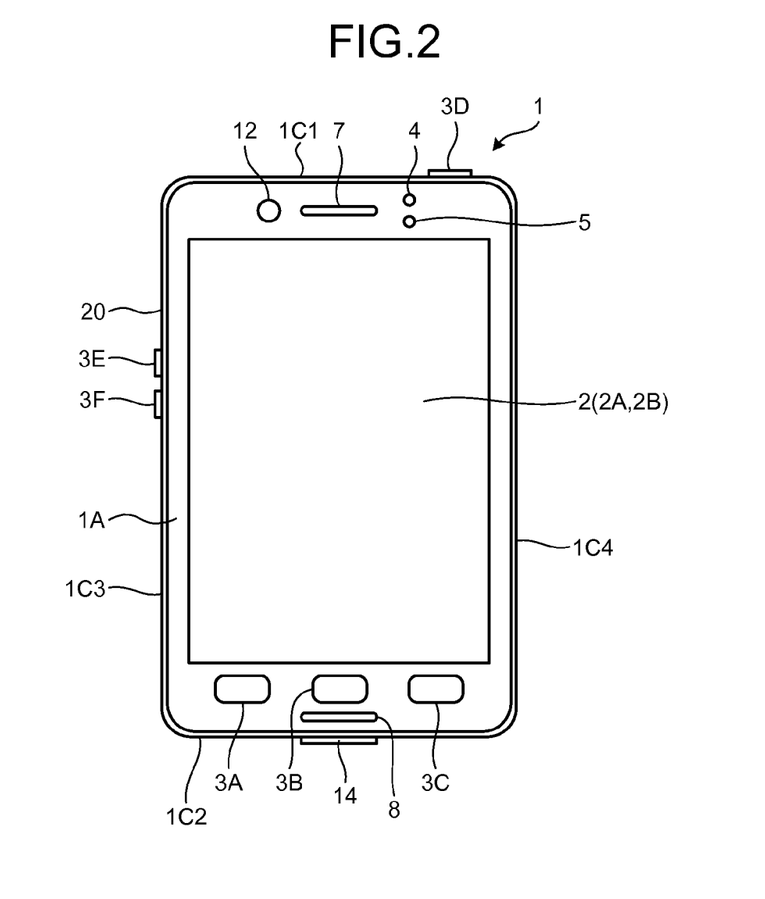
FIG. 2 is a front view illustrating an external appearance of a smartphone according to an embodiment of some embodiments.
Figure 3:
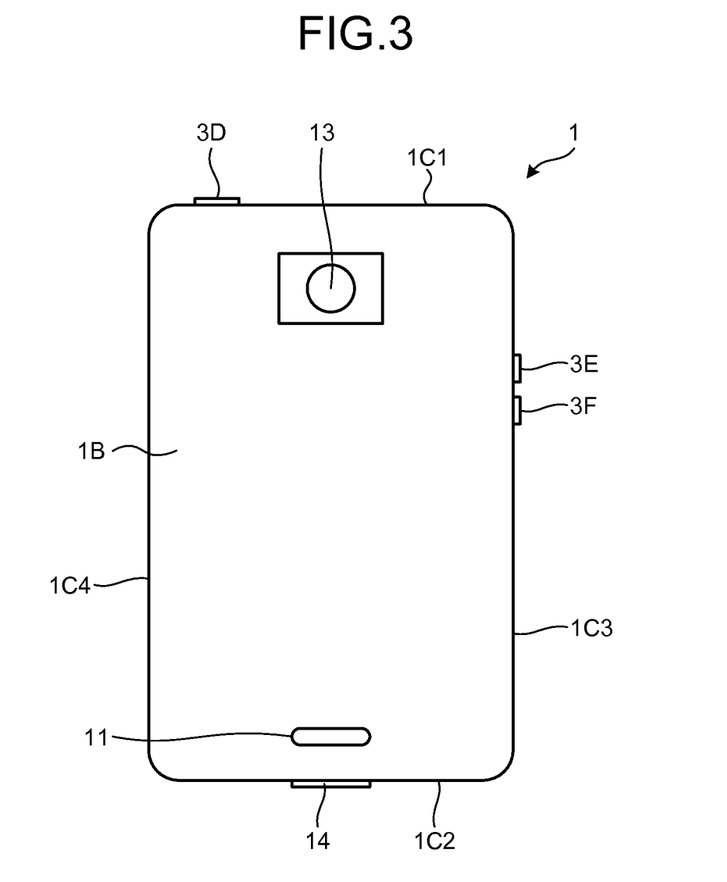
FIG. 3 is a back view illustrating an external appearance of a smartphone according to an embodiment of some embodiments.

An overall configuration of a smartphone 1 according to an embodiment will be described with reference to FIGS. 1 to 3. The smartphone 1 includes a housing 20 as illustrated in FIGS. 1 to 3. The housing 20 includes a front face 1A, a back face 1B, and side faces 1C1 to 1C4. The front face 1A is a front face of the housing 20. The back face 1B is a back face of the housing 20. The side faces 1C1 to 1C4 are side faces connecting the front face 1A with the back face 1B. In the following description, there are cases in which the side faces 1C1 to 1C4 are referred to collectively as a "side face 1C" without specifying a specific face.

The smartphone 1 includes a touch screen display 2, buttons 3A to 3C, an illuminance sensor 4, a proximity sensor 5, a receiver 7, a microphone 8, and a camera 12 on the front face 1A. The smartphone 1 includes a speaker 11 and a camera 13 on the back face 1B. The smartphone 1 includes buttons 3D to 3F and a connector 14 on the side face 1C. In the following description, there are cases in which the buttons 3A to 3F are referred to collectively as a "button 3" without specifying a certain button.

The touch screen display 2 includes a display 2A and a touch screen 2B. The display 2A is equipped with a display device such as a liquid crystal display (LCD), an organic electro-luminescence (EL) panel, or an inorganic EL panel. The display 2A displays a text, an image, a symbol, or a diagram.

The touch screen 2B detects, for example, a contact of a finger, a pen, or a stylus pen with the touch screen 2B. The touch screen 2B can detect a position at which a plurality of fingers, pens, stylus pens, or the like contacts with the touch screen 2B.

A detection method of the touch screen 2B may be an arbitrary method such as a capacitive method, a resistive method, a surface acoustic wave (SAW) (an ultrasonic method), an infrared method, an electromagnetic induction method, or a load detection method. Hereinafter, in order to simplify a description, there are cases in which a finger, a pen, a stylus pen, and the like whose contact is detected through the touch screen 2B are referred to simply as a "finger."

The smartphone 1 determines a type of gesture based on at least one of a contact detected by the touch screen 2B, a position at which a contact is detected, an interval at which a contact is detected, and the number of contact detections. A gesture is an operation performed on the touch screen 2B. Examples of the gesture determined by the smartphone 1 include, but are not limited to, a touch, a long touch, a release, a swipe, a tap, a double tap, a long tap, a drag, a flick, a pinch-in, and a pinch-out.

The "touch" is a gesture in which the finger touches the touch screen 2B. The smartphone 1 determines a gesture in which the finger contacts with the touch screen 2B as the touch. The smartphone 1 determines a gesture in which a single finger contacts with the touch screen 2B as a single touch. The smartphone 1 determines a gesture in which a plurality of fingers contacts with the touch screen 2B as a multi-touch. The smartphone 1 detects the number of fingers whose contact is detected in the case of multi-touch. The "long touch" is a gesture in which the finger touches the touch screen 2B during a predetermined period of time or more. The smartphone 1 determines a gesture in which the finger contacts with the touch screen 2B during a predetermined period of time or more as the long touch.

The "release" is a gesture in which the finger is separated from the touch screen 2B. The smartphone 1 determines a gesture in which the finger is separated from the touch screen 2B as the release. The "swipe" is a gesture in which the finger moves while contacting with the touch screen 2B. The smartphone 1 determines a gesture in which the finger moves while contacting with the touch screen 2B as the swipe.

The "tap" is a gesture that the release is performed subsequently to the touch. The smartphone 1 determines a gesture in which the release is performed subsequently to the touch as the tap. The "double tap" is a gesture in which the gesture in which the release is performed subsequently to the touch is consecutively performed twice. The smartphone 1 determines a gesture in which the gesture in which the release is performed subsequently to the touch is consecutively performed twice as the double tap.

The "long tap" is a gesture in which the release is performed subsequently to the long touch. The smartphone 1 determines a gesture in which the release is performed subsequently to the long touch as the long tap. The "drag" is a gesture in which the swipe is performed starting from a region on which a movable object is being displayed. The smartphone 1 determines a gesture in which the swipe is performed starting from a region on which a movable object is being displayed as the drag.

The "flick" is a gesture in which the release is performed while moving the finger in one direction subsequently to the touch. The smartphone 1 determines a gesture in which the release is performed while moving the finger in one direction subsequently to the touch as the flick. A moving speed of the flick is faster than moving speeds of the swipe and the drag. Examples of the flick include, but are not limited to, an "upper flick" in which the finger moves in an upward direction of the screen, a "lower flick" in which the finger moves in a downward direction of the screen, a "right flick" in which the finger moves in a right direction of the screen, a "left flick" in which the finger moves in a left direction of the screen, an "oblique upper left flick" in which the finger moves in an oblique upper left direction of the screen, an "oblique lower left flick" in which the finger moves in an oblique lower left direction of the screen, an "oblique upper right flick" in which the finger moves in an oblique upper right direction of the screen, and an "oblique lower right flick" in which the finger moves in an oblique lower right direction of the screen.

The "pinch-in" is a gesture in which a plurality of fingers swipe in an approaching direction. The smartphone 1 determines a gesture in which a plurality of fingers swipe in an approaching direction as the pinch-in. The "pinch-out" is a gesture in which a plurality of fingers swipe in a separating direction. The smartphone 1 determines a gesture in which a plurality of fingers swipe in a separating direction as the pinch-out.

The smartphone 1 performs the operation according to the gesture determined through the touch screen 2B. Thus, operability in which the user can use the smartphone 1 intuitively and easily is implemented. An operation performed according to a determined gesture by the smartphone 1 differs according to a screen displayed on the display 2A. Hereinafter, in order to simplify a description, there are cases in which an expression "the smartphone 1 detects X" or "a controller detects X" is used to mean an expression "the touch screen 2B detects a contact, and the smartphone 1 determines a type of gesture to be X based on the detected contact."

Figure 4:
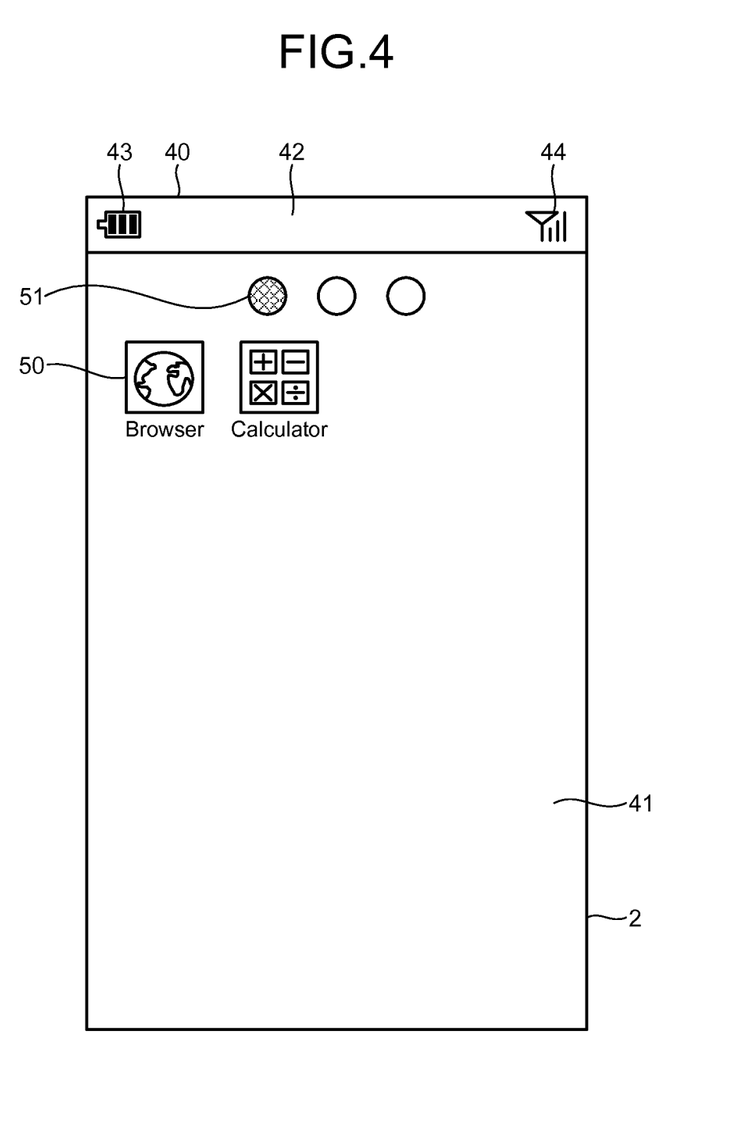
FIG. 4 is a view illustrating an exemplary home screen of a smartphone according to an embodiment of some embodiments.

An exemplary screen displayed on the display 2A will be described with reference to FIG. 4. FIG. 4 illustrates an exemplary home screen. The home screen is also referred to as a "desktop" or an "idle screen." The home screen is displayed on the display 2A. The home screen is a screen in which the user selects an application to be executed among applications installed in the smartphone 1. The smartphone 1 executes an application selected on the home screen on the foreground. A screen of the application executed on the foreground is displayed on the display 2A.

In the smartphone 1, an icon may be arranged on the home screen. A plurality of icons 50 are arranged on a home screen 40 illustrated in FIG. 4. Each of the icons 50 is associated with an application installed in the smartphone 1 in advance. Upon detecting the gesture on the icon 50, the smartphone 1 executes the application associated with the icon 50. For example, upon detecting the tap on the icon 50 associated with a mail application, the smartphone 1 executes the mail application.

The icon 50 includes an image and a character string. The icon 50 may include a symbol or a diagram instead of an image. The icon 50 may include neither an image nor a character string. The icons 50 may be arranged based on an arrangement pattern. Wallpaper 41 is displayed on the back of the icon 50. The wallpaper is also called a photo screen or a back screen. The smartphone 1 can use an arbitrary image as the wallpaper 41. An arbitrary image may be decided as the wallpaper 41 according to a setting performed by the user.

The smartphone 1 may increase the number of home screens 40. For example, the smartphone 1 may decide the number of home screens 40 according to a setting performed by the user. When there is a plurality of home screens 40, the smartphone 1 causes a selected home screen to be displayed on the display 2A.

The smartphone 1 displays a locator 51 including one or more symbols on the home screen 40. The number of symbols is equal to the number of home screens 40. The locator 51 indicates the home screen 40 that is currently being displayed. In the locator 51, a symbol corresponding to the home screen 40 that is currently being displayed is displayed in a different from the other symbols.

In an example illustrated in FIG. 4, the locator 51 including three symbols is displayed. This indicates that the number of home screens 40 is 3. Each of the three symbols has a circular shape. In an example illustrated in FIG. 4, a symbol at the left end is displayed in a different form from the other symbols. In other words, the symbols except the symbol at the left end are displayed as a circular rim, but the symbol at the left end is displayed in a form in which the inside of the circular rim is filled. This indicates that the home screen 40 at the left end is currently being displayed on the display 2A.

Upon detecting a gesture in a crosswise direction while the home screen 40 is being displayed, the smartphone 1 switches the home screen 40 displayed on the display 2A according to the gesture. For example, upon detecting the right flick, the smartphone 1 switches the home screen 40 displayed on the display 2A to the next home screen 40 on the left. For example, upon detecting the left flick, the smartphone 1 switches the home screen 40 displayed on the display 2A to the next home screen 40 on the right. A process in which the smartphone 1 switches the home screen 40 in the crosswise direction according to the flick gesture in the crosswise direction will be described in detail later. When the home screen 40 is switched in the crosswise direction, the smartphone 1 updates a display of the locator 51 according to the position of the switched home screen 40.

A region 42 is disposed on the top of the display 2A. A remaining level mark 43 indicating a remaining battery level and a radio level mark 44 indicating field strength of a radio wave for communication are displayed on the region 42. The smartphone 1 may display a time, weather, an application being executed, a type of communication system, a phone call status, a device mode, an event occurring in a device, or the like on the region 42. As described above, the region 42 are used to given various kinds of notifications to the user. The region 42 may disposed on a screen other than the home screen 40. The position at which the region 42 is disposed is not limited to the top of the display 2A.

A vertical direction of the home screen 40 is a direction based on a vertical direction of a text or an image displayed on the display 2A. Thus, a side of the home screen 40 close to the region 42 in a longitudinal direction of the touch screen display 2 is an upper side of the home screen 40, and a side of the home screen 40 far from the region 42 is a lower side of the home screen 40. A side of the region 42 at which the radio level mark 44 is displayed is a right side of the home screen 40, and a side of the region 42 at which the remaining level mark 43 is displayed is a left side of the home screen 40. The smartphone 1 decides, for example, the oblique upper left direction, the oblique lower right direction, the left direction, and the right direction of the home screen 40 based on the vertical direction of the text or the image displayed on the home screen 40.

The home screen 40 illustrated in FIG. 4 is an example, and forms of various kinds of elements, an arrangement of various kinds of elements, the number of home screens 40, and various kinds of operation methods on the home screen 40 may be different from those described above.

Figure 5:
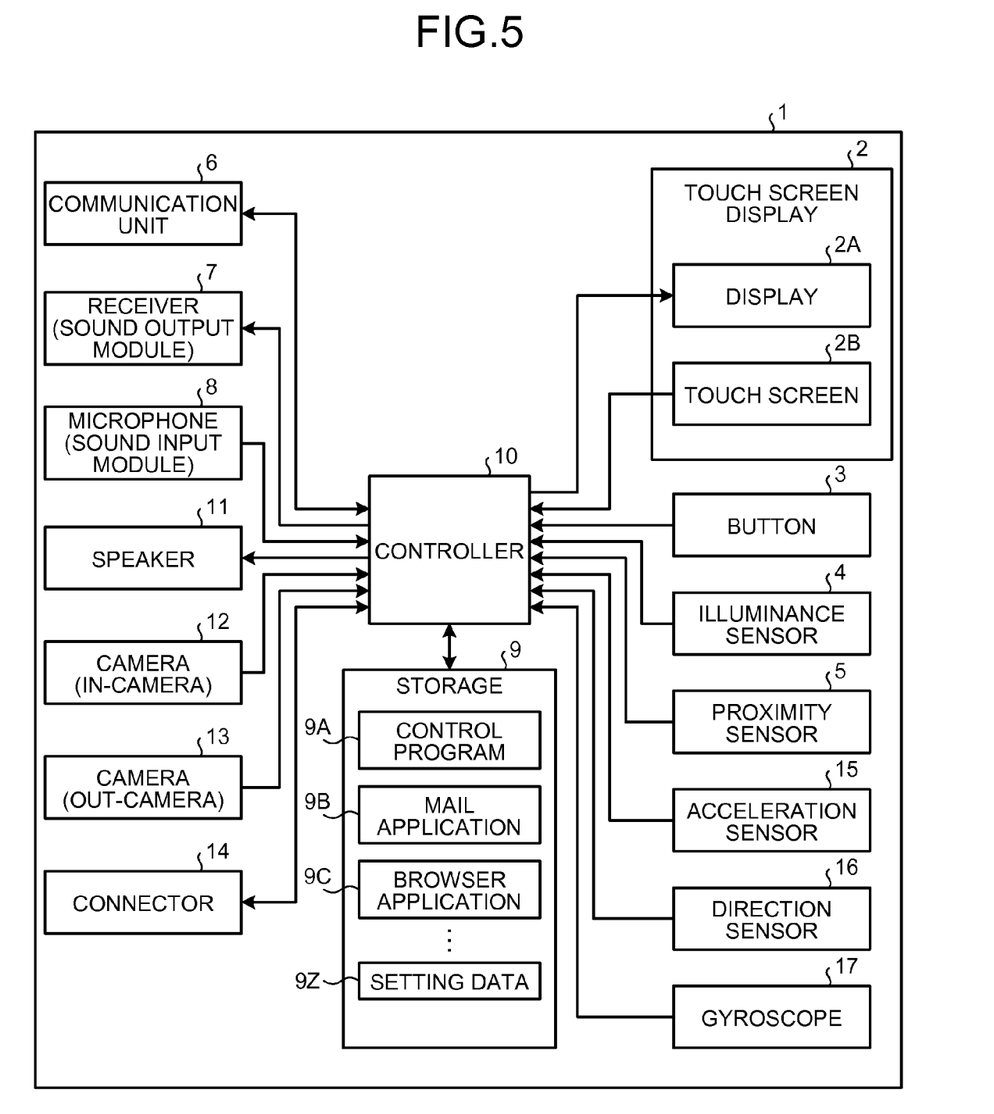
FIG. 5 is a block diagram illustrating a function of a smartphone according to an embodiment of some embodiments.

FIG. 5 is a block diagram illustrating a configuration of the smartphone 1. The smartphone 1 includes the touch screen display 2, the button 3, the illuminance sensor 4, the proximity sensor 5, a communication unit 6, the receiver 7, the microphone 8, a storage 9, a controller 10, the speaker 11, the cameras 12 and 13, the connector 14, an acceleration sensor 15, a direction sensor 16, and a gyroscope 17.

The touch screen display 2 includes the display 2A and the touch screen 2B as described above. The display 2A displays a text, an image, a symbol, a diagram, or the like. The touch screen 2B detects a contact. The controller 10 detects a gesture on the smartphone 1. The controller 10 detects an operation (gesture) on the touch screen 2B (the touch screen display 2) in collaboration with the touch screen 2B.

The button 3 is operated by the user. The button 3 includes the buttons 3A to 3F. The controller 10 detects an operation on the button 3 in collaboration with the button 3. Examples of the operation on the button 3 include, but are not limited to, a click, a double click, a triple click, a push, a multi-push.

The buttons 3A to 3C are, for example, a home button, a back button, and a menu button. The button 3D is, for example, a power on/off button of the smartphone 1. The button 3D may function as a sleep/wake-up button as well. The buttons 3E and 3F are, for example, volume buttons.

The illuminance sensor 4 detects illuminance. The illuminance indicates intensity, brightness, or luminance of light. For example, the illuminance sensor 4 is used to adjust luminance of the display 2A. The proximity sensor 5 detects the presence of a nearby physical body in a non-contact manner. For example, the proximity sensor 5 detects that the touch screen display 2 has gotten closer to a face. The illuminance sensor 4 and the proximity sensor 5 may be configured as a single sensor.

The communication unit 6 performs wireless communication. A communication scheme performed by the communication unit 6 is a wireless communication standard. As the wireless communication standard, there are cellular communication standards such as 2G, 3G, and 4G communication standards, for example. Examples of the cellular communication standard include, but are not limited to, long term evolution (LTE), wideband code division multiple access (W-CDMA), CDMA2000, personal digital cellular (PDC), global system for mobile communications (GSM (a registered trademark)), and personal handy-phone system (PHS). Examples of the wireless communication standard include, but are not limited to, worldwide interoperability for microwave access (WiMAX), IEEE802.11, Bluetooth (a registered trademark), infrared data association (IrDA), and near field communication (NFC). The communication unit 6 may support one or more communication standards described above.

The receiver 7 and the speaker 11 output a sound signal transmitted from the controller 10 as a sound. For example, the receiver 7 is used to output a voice of a counterpart during a phone call. For example, the speaker 11 is used to output a ring tone and music. One of the receiver 7 and the speaker 11 may have a function of the other. The microphone 8 converts a voice of the user into a voice signal, and transmits the voice signal to the controller 10.

The storage 9 stores a program and data. The storage 9 is also used as a work region that temporarily stores a processing result of the controller 10. The storage 9 may include an arbitrary non-transitory storage device such as a semiconductor memory device or a magnetic storage device. The storage 9 may include a plurality of types of storage devices. The storage 9 may include a combination of a portable storage medium such as a memory card, an optical disk, or a magneto optical disk and a storage medium reading device.

Examples of a program stored in the storage 9 include an application executed on the foreground or the background and a control program that supports an operation of an application. For example, the application causes the screen to be displayed on the display 2A and causes the controller 10 to execute a process according to a gesture detected through the touch screen 2B. The control program is, for example, an OS. The application and the control program may be installed in the storage 9 through a wireless communication performed by the communication unit 6 or a non-transitory storage medium.

The storage 9 stores, for example, a control program 9A, a mail application 9B, a browser application 9C, and setting data 9Z. The mail application 9B provides an e-mail function. For example, it is possible to compose, transmit, receive, and display an e-mail through the e-mail function. The browser application 9C provides a web browsing function. For example, it is possible to display a web page and edit a bookmark through the web browsing function. The setting data 9Z provides various kinds of setting functions related to the operation of the smartphone 1.

The control program 9A provides a function related to various kinds of control for operating the smartphone 1. The control program 9A controls, for example, the communication unit 6, the receiver 7, the microphone 8, and the like such that a phone call is implemented. A function of changing the home screen 40 that is displayed according to the gesture is included as the function provided by the control program 9A. There are cases in which the function provided by the control program 9A is used in combination with a function provided by another program such as the mail application 9B.

The controller 10 is an operational circuit. Examples of the operational circuit include, but are not limited to, a central processing unit (CPU), a system-on-a-chip (SoC), a micro control unit (MCU), or a field-programmable gate array (FPGA). The controller 10 integrally controls the operation of the smartphone 1 such that various kinds of functions are implemented.

Specifically, the controller 10 executes a command included in the program stored in the storage 9 with reference to data stored in the storage 9 as necessary. The controller 10 controls functional modules such as the display 2A and the communication unit 6 according to the data and the command such that various kinds of functions are implemented. There are cases in which the controller 10 changes control according to a detection result of a detecting module. The functional module includes the display 2A, the communication unit 6, the microphone 8, and the speaker 11 but is not limited thereto. The detecting module includes the touch screen 2B, the button 3, the illuminance sensor 4, the proximity sensor 5, the receiver 7, the camera 12, the camera 13, the acceleration sensor 15, the direction sensor 16, and the gyroscope 17 but is not limited thereto.

The controller 10 executes, for example, the control program 9A and changes the home screen 40 displayed according to the gesture.

The camera 12 is an in-camera that images a physical body facing the front face 1A. The camera 13 is an out-camera that images a physical body facing the back face 1B.

The connector 14 is a terminal to which another device is connected. The connector 14 may be a general-purpose terminal such as a universal serial bus (USB) terminal, a high-definition multimedia interface (HDMI (a registered trademark)) terminal, a light peak (which may be Thunderbolt (a registered trademark)) terminal, or an earphone microphone connector. The connector 14 may be a dedicated terminal such as a dock connector. Examples of the device connected to the connector 14 include, but are not limited to, an external storage, a speaker, and a communication device.

The acceleration sensor 15 detects a direction and a magnitude of acceleration working on the smartphone 1. The direction sensor 16 detects an orientation of geomagnetism. The gyroscope 17 detects an angle and an angular velocity of the smartphone 1. The detection results of the acceleration sensor 15, the direction sensor 16 and the gyroscope 17 are combined and used in order to detect a change in a position and an attitude of the smartphone 1.

Some or all of the programs stored in the storage 9 in FIG. 5 may be downloaded from another device through wireless communication performed by the communication unit 6. Some or all of the programs stored in the storage 9 in FIG. 5 may be stored in a non-transitory storage medium that is readable by a reading device included in the storage 9. Some or all of the programs stored in the storage 9 in FIG. 5 may be stored in a non-transitory storage medium that is readable by a reading device connected to the connector 14. Examples of the non-transitory storage medium include, but are limited to, an optical disk such as a CD (a registered trademark), a DVD (a registered trademark), or a Blu-ray (a registered trademark), a magneto optical disk, and a memory card.

The configuration of the smartphone 1 illustrated in FIG. 5 is an example and may be appropriately modified within the scope not departing from the gist of the present application. For example, the number and types of buttons 3 are not limited to those in an example of FIG. 5. The smartphone 1 may be equipped with buttons a ten-key arrangement or a QWERTY arrangement as buttons for an operation related to the screen instead of the buttons 3A to 3C. The smartphone 1 may be equipped with one button for an operation related to the screen or may be equipped with no button. In an example illustrated in FIG. 5, the smartphone 1 is equipped with two cameras, but the smartphone 1 may be equipped with one camera or may be equipped with no camera. In an example illustrated in FIG. 5, the smartphone 1 is equipped with the three types of sensors for detecting a position and an attitude, but the smartphone 1 may not be equipped with some of the sensors. Alternatively, the smartphone 1 may be equipped with any other type of sensor for detecting at least one of a position and an attitude.

A process performed by the smartphone 1 according to the gesture of the user on the touch screen display 2 will be described below with reference to FIGS. 6 to 13.

Figure 6:
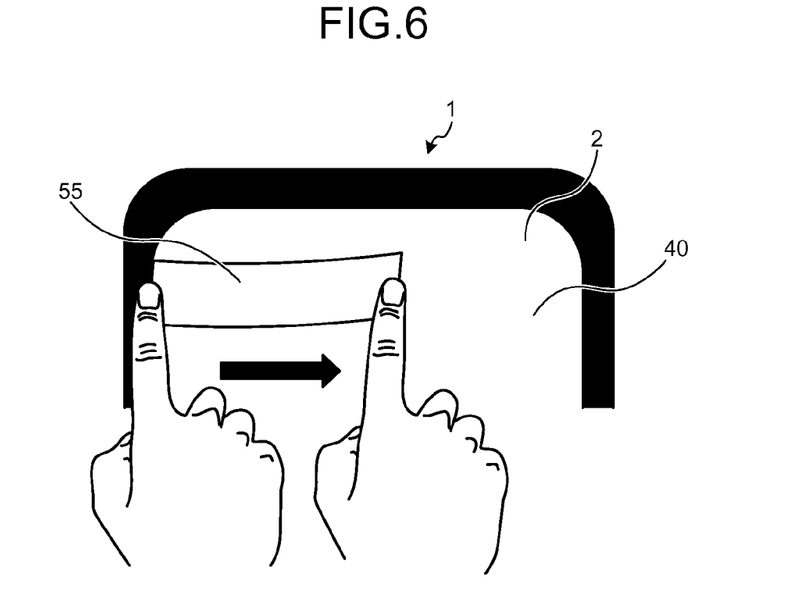
FIG. 6 is a view illustrating a first example of control performed by a smartphone according to an embodiment of some embodiments.

FIG. 6 is a view illustrating a first example of control performed by a smartphone according to an embodiment. In FIG. 6, the user moves the finger in the right direction in a state in which the finger contacts to a predetermined region nearby the left end of the home screen 40. Or, the user is tracing the surface of the touch screen display 2. At this time, the controller 10 of the smartphone 1 detects the swipe. Specifically, the controller 10 detects the swipe performed in the right direction starting from the inside of the predetermined region near by the left end of the home screen 40. Then, when the user moves the finger in the right direction, the controller 10 causes a memo object 55 to be displayed on the home screen 40 according to the trajectory of the moving. The memo object 55 is an object having a tag shape. The memo object 55 is displayed as if a portion thereof positioned at the left end side of the home screen 40 serving as the starting point of the swipe is attached to the home screen 40. The memo object 55 is displayed corresponding to a region traced by the user.

The predetermined region nearby the left end of the home screen 40 is, for example, a region between the left end of the home screen 40 and a position that is away from the left end of the home screen 40 by a length of one twentieth (1/20) of the length of the home screen 40 in the lateral direction. A position and an area size of the predetermined region can be appropriately set. For example, the predetermined region may be a region nearby any one of the right end, the lower end, or the upper end of the home screen 40.

When the memo object 55 is displayed on the home screen 40, the controller 10 may display the memo object 55 such that the memo object 55 gradually increases in length (gradually extends) while following the finger of the user while the swipe is being performed. The controller 10 may not display the memo object 55 while the swipe is being performed, and instead, when the swipe ends, that is, when the finger of the user is detected to have been separated from the touch screen 2B, the controller 10 may display the memo object 55 initially at that point in time. The controller 10 may set the length of the memo object 55 to be equal to the length of the trajectory of the swipe or may set the length of the memo object 55 to be smaller or larger than the length of the trajectory of the swipe.

Figure 7:
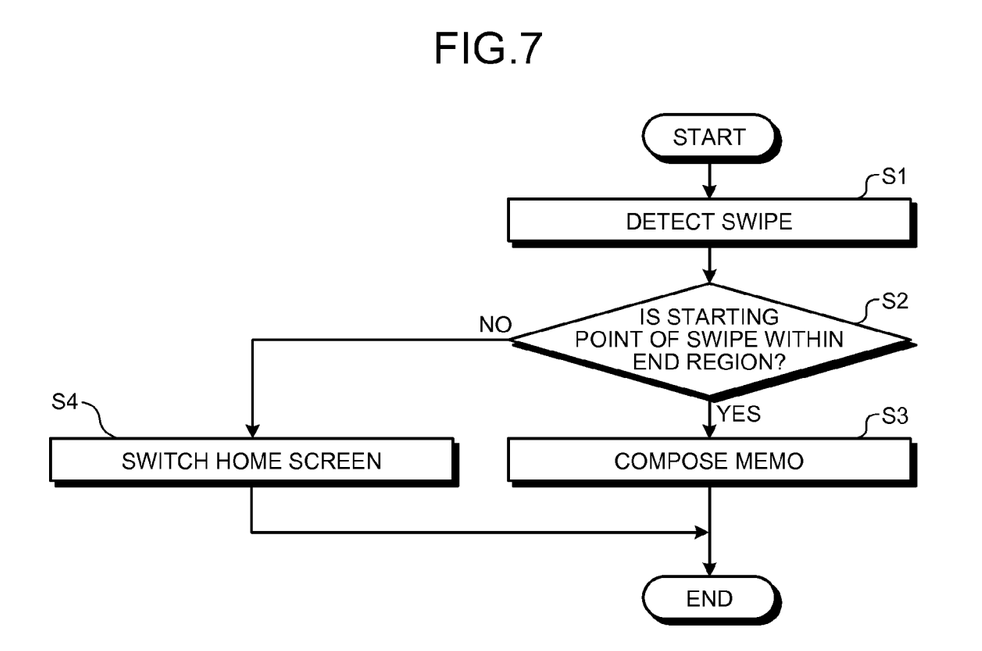
FIG. 7 is a flowchart illustrating a processing procedure of control performed by a smartphone according to an embodiment of some embodiments.

FIG. 7 is a flowchart illustrating a processing procedure of a first example of the control performed by a smartphone according to an embodiment.

At step S1, the controller 10 of the smartphone 1 detects the swipe. Subsequently, the controller 10 proceeds to step S2. At step S2, the controller 10 determines whether or not the starting point of the detected swipe is within the region at the end of the home screen 40. In an example illustrated in FIG. 6, the region at the end of the home screen 40 is the region between the left end of the home screen 40 and the position away from the left end of the home screen 40 by a length of one twentieth (1/20) of the length of the home screen 40 in the lateral direction. When the starting point of the detected swipe is determined to be within the region at the end of the home screen 40 (Yes at step S2), the controller 10 proceeds to step S3. When the starting point of the detected swipe is determined to be not within the region at the end of the home screen 40 (No at step S2), the controller 10 proceeds to step S4.

At step S3, the controller 10 causes the memo object 55 to be displayed along the trajectory of the swipe on the home screen 40. At step S4, the controller 10 changes the home screen 40 to another home screen.

Figure 8:
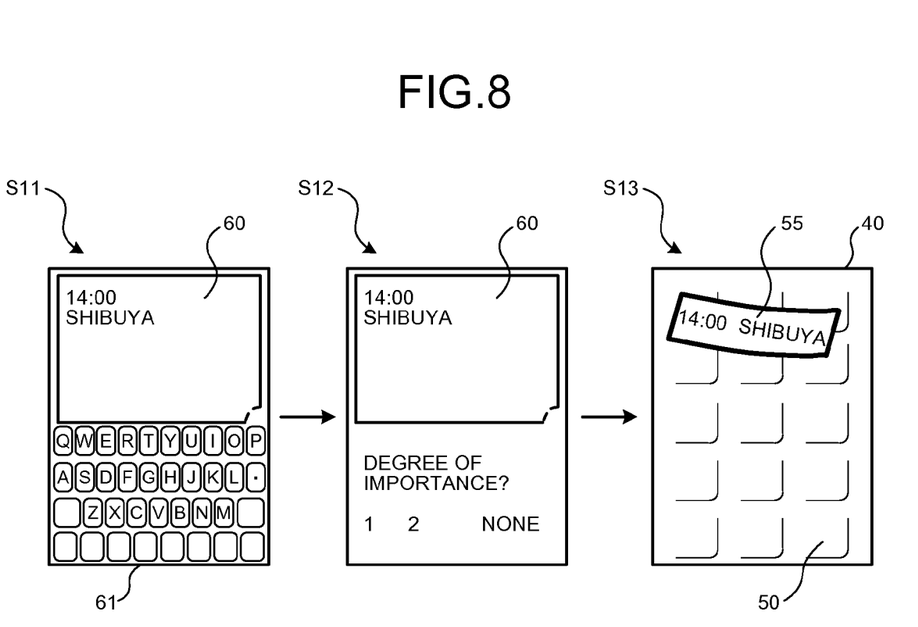
FIG. 8 is a view illustrating a process of inputting a text onto a memo object according to an embodiment of some embodiments.

Then, a process of inputting a text onto the memo object 55 will be described with reference to FIG. 8. FIG. 8 is a view illustrating a process of inputting a text onto the memo object. When the memo object 55 is displayed through the process illustrated in FIG. 6, the controller 10 of the smartphone 1 displays a text input screen illustrated at step S11 of FIG. 8 so that a text can be input onto the memo object 55. The text input screen includes a text input region 60 and a keyboard 61. At step S11 of FIG. 8, an example in which the user inputs a character string "14:00 Shibuya" onto the text input region 60 is illustrated.

Upon detecting the tap on the memo object 55 after the memo object 55 is displayed, the controller 10 may transition to the text input screen. The controller 10 may automatically transition to the text input screen while displaying the memo object 55 when the swipe ends, that is, when the finger of the user is detected to have been separated from the touch screen 2B.

When an input of the text is decided, a degree of importance of the memo object 55 may be set as illustrated at step S12 of FIG. 8. Of course, transition to a screen in which a degree of importance is set may not be performed.

Then, when the input of the text is decided based on the operation of the user, and when a degree of importance of the memo object 55 is set, the controller 10 causes the memo object 55 to be displayed on the home screen 40 at step S13 of FIG. 8. The text input to the text input region 60 at step S11 of FIG. 8 is displayed on the memo object 55. At step S13 of FIG. 8, the memo object 55 is displayed to overlap some of a plurality of icons 50 displayed on the home screen 40.

Figure 9A:
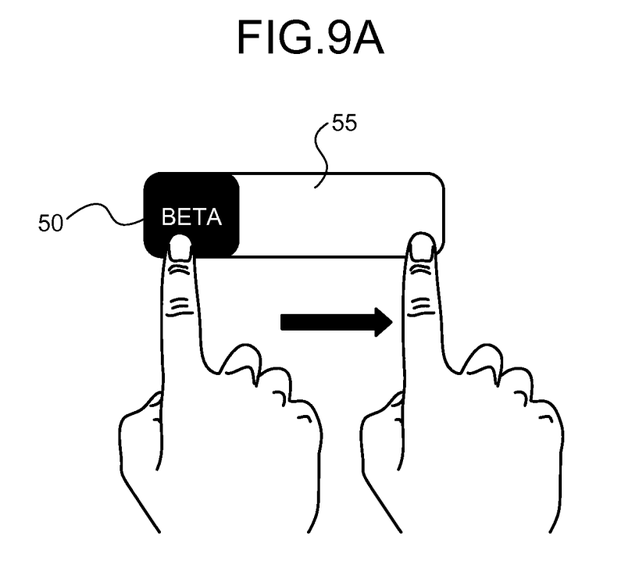
FIG. 9A is a view illustrating a second example of control performed by a smartphone according to an embodiment of some embodiments.
Figure 9B:
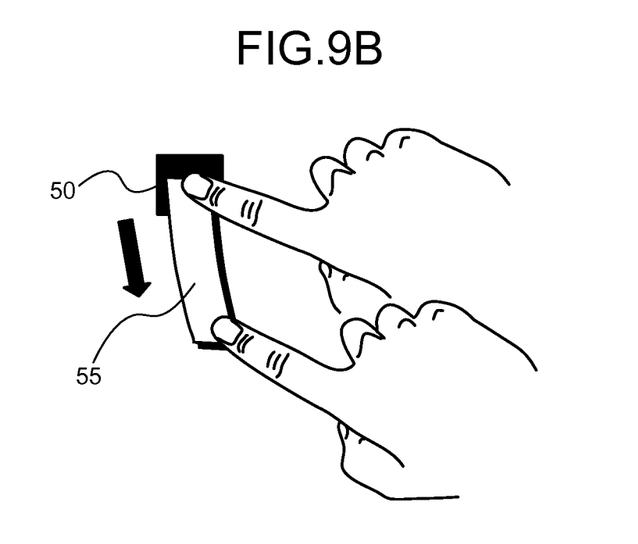
FIG. 9B is a view illustrating a second example of the control performed by a smartphone according to an embodiment of some embodiments.

FIGS. 9A and 9B are views illustrating a second example of control performed by a smartphone according to an embodiment. The icon 50 corresponding to the memo application is displayed on the home screen 40 as illustrated in FIG. 9A. Further, the user moves the finger in the right direction in a state in which the finger contacts to the icon 50. At this time, the controller 10 of the smartphone 1 detects the swipe in the right direction starting from the icon 50. Then, when the user moves the finger in the right direction, the controller 10 causes the memo object 55 to be displayed on the home screen 40 in the crosswise direction along the trajectory of the moving. In FIG. 9A, the memo object 55 is displayed to be drawn from the icon 50.

FIG. 9A illustrates an example in which the user performs the swipe in the right direction from the icon 50 corresponding to the memo application, but the direction of the swipe is not limited thereto. In FIG. 9B, the user performs the swipe in the downward direction from the icon 50. Upon detecting the swipe in the downward direction starting from the icon 50, the controller 10 causes the memo object 55 that is long in the vertical direction to be displayed on the home screen 40 along the trajectory of the swipe.

The controller 10 may decide whether the text can be written on the memo object 55 vertically or horizontally according to the direction of the swipe. In other words, when the horizontally long memo object 55 is displayed as illustrated in FIG. 9A, the text may be written horizontally on the text input region 60 of step S11 of FIG. 8, whereas when the vertically long memo object 55 is displayed as illustrated in FIG. 9B, the text may be written vertically on the text input region 60.

Figure 10:
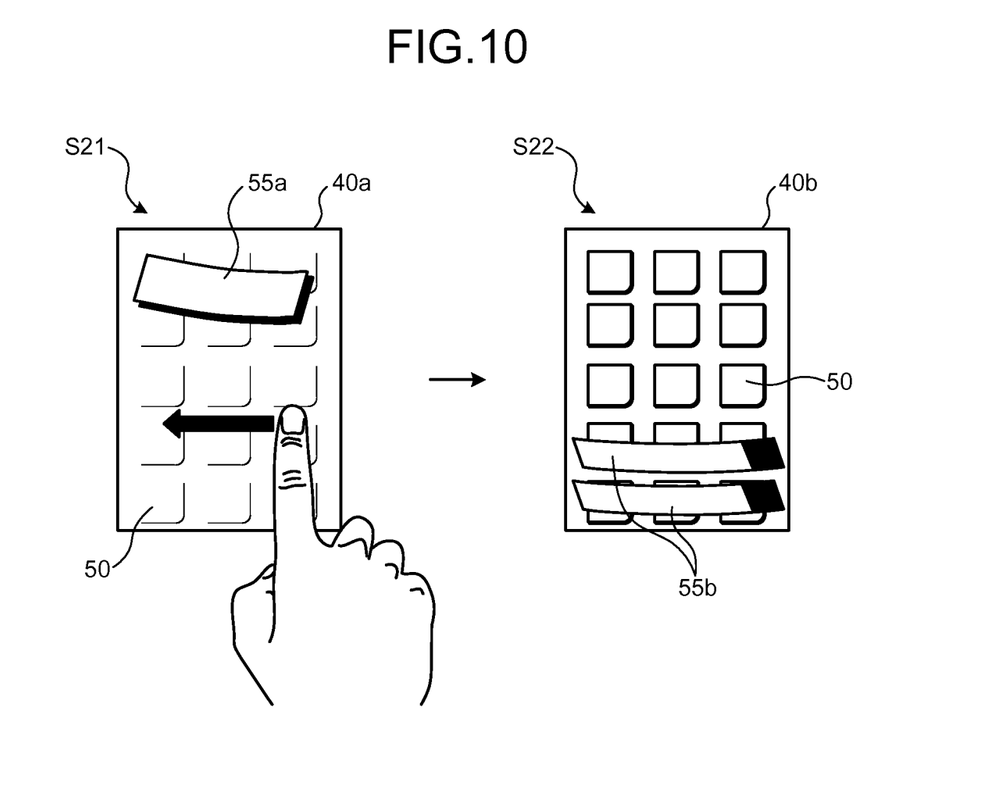
FIG. 10 is a view illustrating a third example of control performed by a smartphone according to an embodiment of some embodiments.

FIG. 10 is a view illustrating a third example of control performed by a smartphone according to an embodiment. At step S21 of FIG. 10, the user performs the swipe in the left direction on a home screen 40a on which a memo object 55a is displayed. The starting point of the swipe is nearby the center of the home screen 40a rather than the inside of the predetermined region at the end of the home screen 40a. The controller 10 determines that the starting point of the detected swipe is not the inside of the region at the end of the home screen 40a as illustrated in the flowchart of FIG. 7, and changes the home screen 40a to a home screen 40b that is a home screen on the right of the home screen 40a as illustrated at step S22 of FIG. 10. At this time, the controller 10 causes a different memo object 55b from the memo object 55a that is originally displayed to be displayed on the home screen 40b.

As described above, the controller 10 associates the memo object 55a with the home screen 40a, and causes the associated memo object 55b to be displayed on the home screen 40b displayed on the display 2A when the gesture for changing (or switching) the home screen 40a is performed. The controller 10 may cause the memo object 55a to be displayed on the home screen 40b, for example, when the gesture of changing (or switching) the home screen 40a is performed in the state in which the tap on the memo object 55a is detected. In other words, the controller 10 may change the home screen in a state in which the memo object 55a is displayed.

Figure 11A:
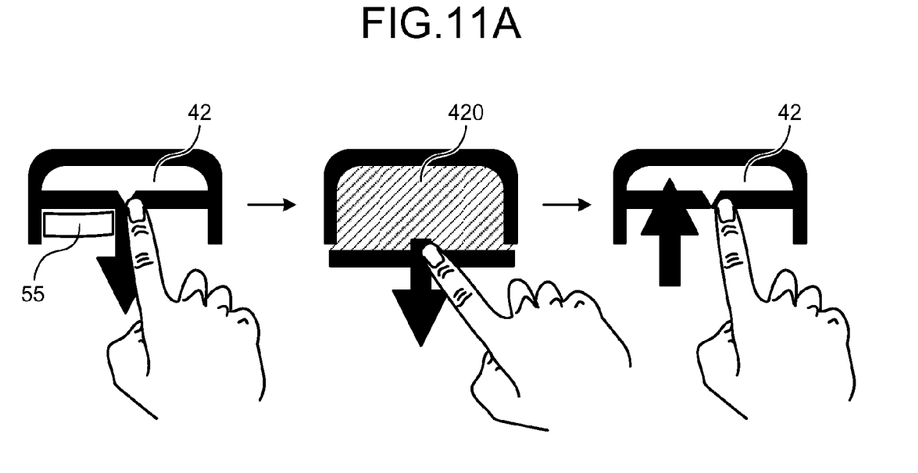
FIG. 11A is a view illustrating a fourth example of control performed by a smartphone according to an embodiment of some embodiments.
Figure 11B:
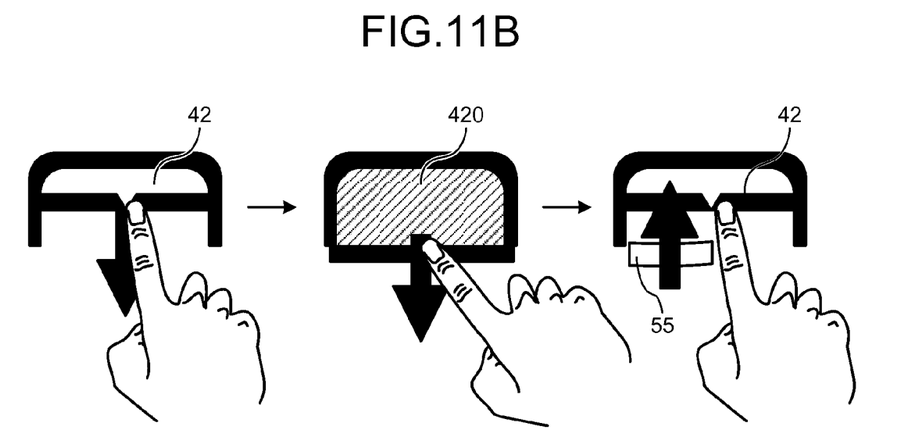
FIG. 11B is a view illustrating the fourth example of the control performed by a smartphone according to an embodiment of some embodiments.

FIGS. 11A and 11B are views illustrating a fourth example of control performed by a smartphone according to an embodiment. In FIG. 11A, when the memo object 55 is being displayed on the home screen 40, the user performs the swipe on the region 42 in the downward direction. Upon detecting the swipe on the region 42, the controller 10 displays a drawer 420 while following the swipe. The drawer 420 is a region on which various information such as information indicating that there is a non-read mail and information indicating that an application has been updated. As illustrated in FIG. 11A, the controller 10 causes the memo object 55 to be covered with the drawer 420 drawn from the region 42 according to the swipe of the user, and thereafter causes the memo object 55 to disappear when the user performs the swipe on the drawer 420 in a direction (a direction for returning the drawn drawer 420 to the region 42) facing the region 42. As a result, visibility of the home screen 40 is secured.

After the memo object 55 disappears, when the user causes the drawer 420 to be displayed again and then performs the gesture for returning the drawer 420, the memo object 55 is displayed on the home screen 40 again as illustrated in FIG. 11B.

Figure 12:
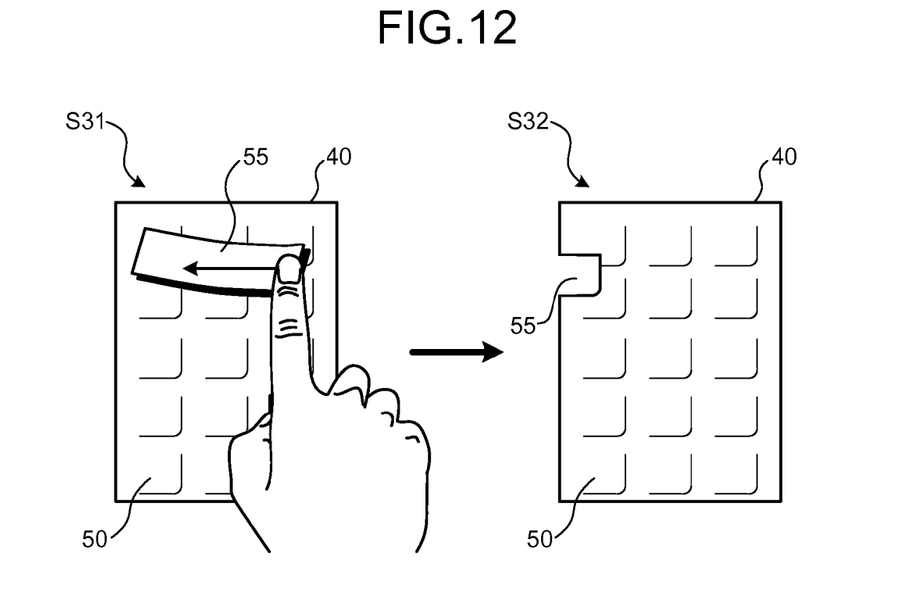
FIG. 12 is a view illustrating a fifth example of control performed by a smartphone according to an embodiment of some embodiments.

FIG. 12 is a view illustrating a fifth example of control performed by a smartphone according to an embodiment. At step S31 of FIG. 12, the user performs the flick on the memo object 55 displayed on the home screen 40 in the left direction. Upon detecting the flick performed on the memo object 55 in the left direction, the controller 10 causes the memo object 55 to be displayed on the home screen 40 so that a part of the memo object 55 extended from the end of the home screen 40 as illustrated at step S32 of FIG. 12. At step S31 of FIG. 12, for example, when "14:00 Shibuya" is input on the memo object 55 as illustrated at step S13 of FIG. 8, "Shibu 14" may be displayed on a part of the memo object 55 positioned at the end of the home screen 40 in the state illustrated at step S32 of FIG. 12. In other words, when the memo object 55 on which a predetermined character string is input transitions to the state in which only a part thereof is displayed, the controller 10 may cause a part of the input character string to be displayed on the part of the memory object. As a result, the user can check the presence of the memo object while checking the visibility of the home screen 40, and thus the usability is improved.

Figure 13:
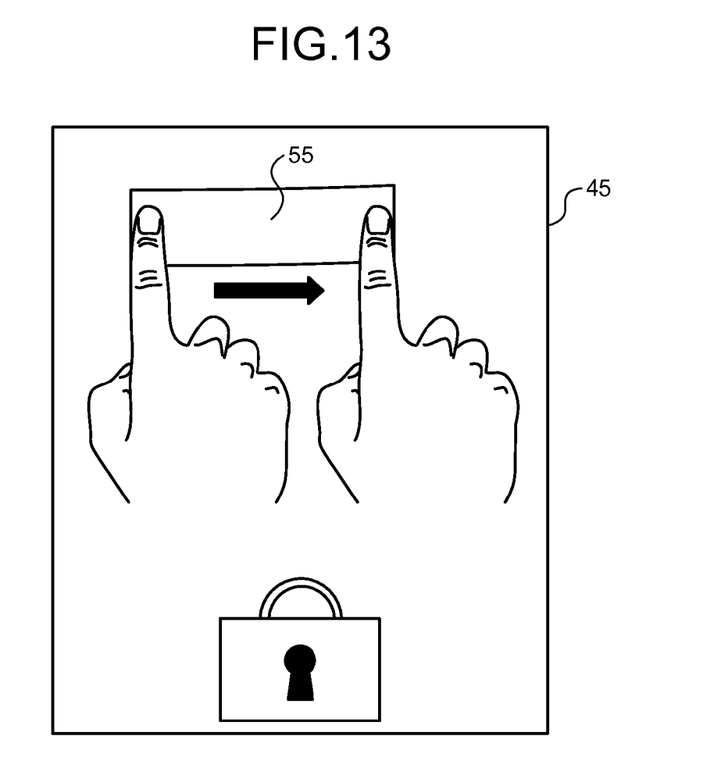
FIG. 13 is a view illustrating a sixth example of control performed by a smartphone according to an embodiment of some embodiments.

FIG. 13 is a view illustrating a sixth example of control performed by a smartphone according to an embodiment. In FIG. 13, a lock screen 45 is displayed on the display 2A. The lock screen 45 is a screen disposed to prevent unauthorized use of the smartphone 1. The user performs the swipe on the lock screen 45 as illustrated in FIG. 13. Upon detecting the swipe, the controller 10 causes the memo object 55 to be displayed on the lock screen 45 along the trajectory of the swipe.

Since the smartphone 1 can switch and display a plurality of home screens 40 as described above with reference to FIG. 10, the controller 10 can distinguish the swipe for switching the home screen 40 from the swipe for displaying the memo object 55 according to the flowchart illustrated in FIG. 7. However, since the lock screen 45 does not include a screen of a target switched by the swipe, the memo object 55 may be displayed even when the starting point of the swipe is the center of the lock screen in the state in which the lock screen 45 is displayed as illustrated in FIG. 13. In other words, the starting point of the swipe may not be a region at the end of the screen.

Further, when the tap on the memo object 55 is detected in the state in which the memo object 55 is displayed on the lock screen 45, and an unlocking operation is detected to have been performed, the controller 10 may cause the memo object 55 displayed on the lock screen 45 to be displayed on the home screen 40.

As described above, when the swipe on the home screen 40 or the lock screen 45 is performed, the smartphone 1 according to an embodiment displays the memo object 55 on which a text can be input along the trajectory of the swipe. Thus, it is possible to cause a memo object on which information is displayable to be displayed on the home screen through an intuitive operation without activating a specific application, and thus usability is improved. The control of the smartphone 1 according to an embodiment illustrated in FIG. 6 is smaller in the number of processes for arranging the memo object on the home screen than a technique of tapping an icon arranged on the home screen, activating the memo application, and then arranging the memo object on the home screen through a predetermined operation, and thus the usability of the user is improved.

According to the control illustrated in FIG. 9, it is possible to generate the memo object starting from the memo application icon arranged on the home screen 40, and thus the user can easily arrange the memo object on the screen through the intuitive operation.

The smartphone 1 according to an embodiment is not limited to the above-described control examples, and various embodiments are considered. For example, in above examples, information related to a time such as "14:00 Shibuya" is input onto the memo object 55. The controller 10 of the smartphone 1 may cause the memo object 55 on which a time has been input to disappear when the input time elapses as described above. Alternatively, when an input time elapses, the memo object 55 may be display in a form in which the memo object 55 is peeled off from the screen, a form in which a color is dull, a form in which there is a crack, or a form in which it is folded. Thus, when the user inputs his/her schedule on the memo object 55, the user can be notified of that a schedule time has elapsed such that a display form of the memo object 55 in which a schedule time has elapsed is changed as described above. As a result, the user who has been notified of can delete, for example, the memo object 55 in which the time has elapsed.

Further, when the same or similar information as or to information input onto a plurality of memo objects 55 is input, the controller 10 may cause the plurality of memo objects 55 to overlap at least a part of both pieces of information. Thus, the visibility of the home screen can be secured.

Further, when the taps performed at two different points on the home screen 40 or the lock screen 45 are detected, the controller 10 may display the memo object 55. At this time, the length of the memo object 55 may be equal to a distance between the two points at which the tap is detected.

Further, when the swipe in the opposite direction to the swipe for generating the memo object 55 is performed on the memo object 55 as illustrated in FIG. 12, the controller 10 may delete the memo object 55.

The invention claimed is:

1. A device, comprising:
   a touch screen display; and
   a controller configured to,
      in response to a detection, by the touch screen display, of a movement of a physical body in a predetermined direction while contacting with the touch screen display,
         cause an object on which a text is inputtable to be displayed on a screen displayed on the touch screen display, wherein the object is elongated along a trajectory of the movement,
   wherein the controller is configured to
   in response to a first gesture on the screen as a home screen with the object being displayed thereon,
      cause the touch screen display to display, on the home screen, a notification region that covers the object,
   in response to a second gesture on the home screen with the element being displayed thereon, wherein the second gesture is after the first gesture and in a direction opposite to the first gesture,
      cause the touch screen display to stop displaying the notification region and to cause the object to disappear from the home screen,
   in response to a third gesture on the home screen with neither the object nor the notification region being displayed thereon, wherein the third gesture is after the second gesture and in a direction opposite to the second gesture,
      cause the touch screen display to display, on the home screen, the notification region again, and
   in response to a fourth gesture on the home screen with the notification region being again displayed thereon, wherein the fourth gesture is after the third gesture and in a direction opposite to the third gesture,
      cause the touch screen display to stop displaying the notification region and to display the object again on the home screen.

2. The device according to claim 1, wherein while the home screen is being displayed on the touch screen display, the controller is configured to
   cause the object to be displayed on the home screen in response to a detection, by the touch screen display, of the movement starting from an inside of a region at an end of the home screen, and
   change the home screen being displayed to another home screen in response to a detection, by the touch screen display, of the movement starting from an outside of the region at the end of the home screen, and
   the region at the end of the home screen has a predetermined constant width from the end of the home screen.

3. The device according to claim 1, wherein the controller is configured to
   cause the touch screen display to display a home screen on which a predetermined icon is displayed, and
   cause the object to be displayed on the home screen, wherein the object is elongated, starting from the icon, along the trajectory of the movement, in response to (i) a detection of a contact of the physical body to the predetermined icon, and then (ii) a detection of the physical body moving in a predetermined direction in a contact state.

4. The device according to claim 1, wherein the controller is configured to display
   a text vertically written on the object, in response to a direction of the movement being vertical, and
   a text horizontally written on the object, in response to the direction of the movement being horizontal.

5. A device, comprising:
   a touch screen display; and
   a controller configured to,
      in response to a swipe performed on the touch screen display,
   cause an object on which a text is inputtable to be displayed on a screen displayed on the touch screen display, wherein the object is elongated along a trajectory of the swipe,
   wherein the controller is configured to
   in response to a first gesture on the screen as a home screen with the object being displayed thereon,
      cause the touch screen display to display, on the home screen, a notification region that covers the object,
   in response to a second gesture on the home screen with the element being displayed thereon, wherein the second gesture is after the first gesture and in a direction opposite to the first gesture,
      cause the touch screen display to stop displaying the notification region and to cause the object to disappear from the home screen,
   in response to a third gesture on the home screen with neither the object nor the notification region being displayed thereon, wherein the third gesture is after the second gesture and in a direction opposite to the second gesture,
      cause the touch screen display to display, on the home screen, the notification region again, and
   in response to a fourth gesture on the home screen with the notification region being again displayed thereon, wherein the fourth gesture is after the third gesture and in a direction opposite to the third gesture,
      cause the touch screen display to stop displaying the notification region and to display the object again on the home screen.

6. The device according to claim 2, wherein the controller is configured to display
   a text vertically written on the object, in response to a direction of the movement being vertical, and
   a text horizontally written on the object, in response to the direction of the movement being horizontal.

7. The device according to claim 3, wherein the controller is configured to display a text vertically written on the object, in response to a direction of the movement being vertical, and a text horizontally written on the object, in response to the direction of the movement being horizontal.

8. The device according to claim 2, wherein the controller is configured to set the region as one region among a region of a left end of the home screen displayed on the touch screen display, a region of a right end of the home screen displayed on the touch screen display, a region of a top end of the home screen displayed on the touch screen display, and a region of a bottom end of the home screen displayed on the touch screen display.

9. The device according to claim 4, wherein, when the text is displayed vertically, the controller is configured to display an input text vertically in a text input region to input said input text.

10. The device according to claim 1, wherein the controller is configured to gradually increase a length of the object in such a manner that said object follows the movement of the physical body.

11. The device according to claim 1, wherein the controller is configured to increase a length of the object along the trajectory of the movement of the physical body, until the physical body is separated from the touch screen display.

12. The device according to claim 1, wherein the controller is configured to cause the object to be displayed as if a portion of the object corresponding to a starting point of the movement is attached to the screen.

13. The device according to claim 1, wherein the controller is configured to display vertically oriented text on the object which is vertically elongated.

14. The device according to claim 1, wherein the controller is configured to in response to a gesture performed on the object and toward an end of the screen, cause the touch screen display to hide a part of the object and display, on the screen, a remaining part of the object, wherein the remaining part of the object extends from the end of the screen.

15. A device, comprising:

a touch screen display; and a controller configured to, in response to detections, by the touch screen display, of first and second touches at different first and second points, respectively, cause an object on which a text is inputtable to be displayed on a screen displayed on the touch screen display, wherein the object is elongated between the first and second points, wherein the controller is configured to in response to a first gesture on the screen as a home screen with the object being displayed thereon, cause the touch screen display to display, on the home screen, a notification region that covers the object, in response to a second gesture on the home screen with the element being displayed thereon, wherein the second gesture is after the first gesture and in a direction opposite to the first gesture, cause the touch screen display to stop displaying the notification region and to cause the object to disappear from the home screen, in response to a third gesture on the home screen with neither the object nor the notification region being displayed thereon, wherein the third gesture is after the second gesture and in a direction opposite to the second gesture, cause the touch screen display to display, on the home screen, the notification region again, and in response to a fourth gesture on the home screen with the notification region being again displayed thereon, wherein the fourth gesture is after the third gesture and in a direction opposite to the third gesture, cause the touch screen display to stop displaying the notification region and to display the object again on the home screen.

\* \* \* \* \*